US012178756B2

(12) United States Patent
Guerrier

(10) Patent No.: US 12,178,756 B2
(45) Date of Patent: Dec. 31, 2024

(54) DEVICE FOR LIFTING AND TRANSPORTING A PERSON

(71) Applicant: CORBEN, Le Havre (FR)

(72) Inventor: Sandra Guerrier, Le Havre (FR)

(73) Assignee: CORBEN, Le Havre (FR)

( * ) Notice: Subject to any disclaimer, the term of this patent is extended or adjusted under 35 U.S.C. 154(b) by 322 days.

(21) Appl. No.: 17/623,101

(22) PCT Filed: Jul. 1, 2020

(86) PCT No.: PCT/EP2020/068451
§ 371 (c)(1),
(2) Date: Dec. 27, 2021

(87) PCT Pub. No.: WO2021/013484
PCT Pub. Date: Jan. 28, 2021

(65) Prior Publication Data

US 2022/0257438 A1 Aug. 18, 2022

(30) Foreign Application Priority Data

Jul. 23, 2019 (FR) ...................................... 1908317
Jul. 23, 2019 (FR) ...................................... 1908318

(51) Int. Cl.
*A61G 1/003* (2006.01)
*A61G 1/013* (2006.01)
(Continued)

(52) U.S. Cl.
CPC ............. *A61G 1/013* (2013.01); *A61G 1/003* (2013.01); *A61G 1/044* (2013.01); *A61G 1/048* (2013.01)

(58) Field of Classification Search
CPC ........ A61G 1/003; A61G 1/044; A61G 1/048; A61G 1/00; A61G 1/04; A61G 1/03
See application file for complete search history.

(56) References Cited

U.S. PATENT DOCUMENTS

| | | | |
|---|---|---|---|
| 524,824 | A | 8/1894 | Hiser |
| 2,503,314 | A | 4/1950 | Atwood |

(Continued)

FOREIGN PATENT DOCUMENTS

| | | | |
|---|---|---|---|
| CA | 2632100 A1 | 6/2007 | |
| CN | 202724142 U | 2/2013 | |

(Continued)

OTHER PUBLICATIONS

International Search Report issued from corresponding International Application No. PCT/EP2020/068452, mailed Oct. 23, 2020, pp. 1-2, European Patent Office, Rijswijk, The Netherlands.

(Continued)

*Primary Examiner* — Fredrick C Conley
(74) *Attorney, Agent, or Firm* — HAUPTMAN HAM, LLP

(57) ABSTRACT

A device for transporting a person, having a preferably concave support surface (S) extending in a longitudinal manner, on which a person can be transported, the support surface (S) having two lateral edges, and two longitudinal ends, the device further having gripping means of the device, and at least one coupling between each of the gripping means and each of the longitudinal ends, the device being such that the coupling has at least two coupling points including at least one pivot.

19 Claims, 7 Drawing Sheets

(51) Int. Cl.
*A61G 1/044* (2006.01)
*A61G 1/048* (2006.01)

(56) References Cited

U.S. PATENT DOCUMENTS

| | | | | |
|---|---|---|---|---|
| 2,999,251 | A | 9/1961 | Hedges | |
| 3,125,766 | A | 3/1964 | Halperin | |
| 3,653,079 | A * | 4/1972 | Bourgraf | A61G 1/003<br>403/92 |
| 3,921,231 | A | 11/1975 | Bourgraf et al. | |
| 4,480,345 | A * | 11/1984 | Dunn | A61G 1/003<br>5/114 |
| 5,765,243 | A | 6/1998 | Duncan et al. | |
| 5,803,087 | A * | 9/1998 | Thompson | A61G 1/003<br>5/628 |
| 5,950,627 | A | 9/1999 | Bologovsky et al. | |
| 6,568,009 | B2 * | 5/2003 | Linger | A61G 1/0212<br>128/870 |
| 2011/0302718 | A1 * | 12/2011 | Grinberg | A61G 1/048<br>5/628 |
| 2014/0068865 | A1 * | 3/2014 | Heck | A61G 1/06<br>5/625 |
| 2017/0246059 | A1 * | 8/2017 | Chinn | A61G 1/013 |

FOREIGN PATENT DOCUMENTS

| | | | |
|---|---|---|---|
| CN | 103494675 | | 1/2014 |
| CN | 106726176 | A | 5/2017 |
| GB | 2320685 | A | 7/1998 |
| WO | 2013130815 | A1 | 9/2013 |

OTHER PUBLICATIONS

International Search Report issued from corresponding International Application No. PCT/EP2020/068451, mailed Oct. 20, 2020, pp. 1-2, European Patent Office, Rijswijk, The Netherlands.

* cited by examiner

5A

5B

DEVICE FOR LIFTING AND TRANSPORTING A PERSON

RELATED APPLICATIONS

The present application is a National Phase of International Application Number PCT/EP2020/068451, filed Jul. 1, 2020, and claims priority to French Application No. 1908318, filed Jul. 23, 2019, and French Application No. 1908317, filed Jul. 23, 2019.

TECHNICAL FIELD OF THE INVENTION

The present invention generally relates to the field of lifting devices for an individual, particularly the field of two-part stretchers and litters.

STATE OF THE PRIOR ART

In an accident or a fall, it is possible that the victim is down and likely to have a trauma preventing them from getting up. In some cases, it is thus advisable that the victim moves as little as possible, so as not to modify the disposition of their vertebral column so as not to damage it or potentially worsen their situation. Thus, rescuers, once at the accident site, must carefully raise the downed victim in order to transport them so that they can be taken care of. The use of a litter allows reducing the risks when handling the victim.

In order to limit the risk of worsening a possible fracture or a potential lesion of the spinal cord during the mobilization or the transportation of the victim, it may be interesting to immobilize the whole body (and the head) of said victim on the litter. Thus, the handling of the person must be performed in accordance with the regulations that is to say without moving their cervical vertebrae and their vertebral column, which is commonly called in First Aid "the head-neck-trunk axis".

Finally, it is common for the person, the victim or the patient to have a radiology in order to determine the potential fractures and lesions. It may be necessary to have this radiology quickly and prior to moving the patient from the litter to another support, which is why it is strongly recommended that the litters are made of radiolucent material.

In the prior art, it is proposed to use a board on which the victim or the patient is placed in a lying position. Straps allow immobilizing the victim's body on the board, and an optional head immobilizer can be used in order to immobilize the head.

The board is made up of:

- A rectangular plane of a dimension similar to that of a person, made of PVC, if possible radiolucent, water resistant and biologically inert (absorption of biological liquid or blood by the equipment should not be possible to avoid the transmission of infectious germs). This board is equipped with carrying handles;
- Retention straps to immobilize the victim in the thorax, pelvis and lower limbs.

The head immobilizer is composed of:

- A head cushion fixed on the board;
- Two lateral immobilization blocks;
- Two straps for retaining the head in the forehead and the chin.

One of the drawbacks of this solution is that it poses risks when handling the victim to place them on their back lying on the board. Indeed, it is necessary to raise or roll the victim to lay them down on the board. During this handling, the risk of moving the cervical vertebrae and the vertebral column of the victim is particularly present which can lead to worsening their health. Particularly, when the victim to be raised is in a narrow space, the handling is then more complex and sometimes difficult to perform in order to place the victim on the board without the risk of affecting their health.

Another solution is the use of the spoon stretcher, which is a product in two separable parts. The two parts, once assembled, form a system on which it is possible to lay down and transport a victim. The advantage of this solution lies in the possibility of inserting on each side under the victim or the patient, one of the two parts of the stretcher so as to secure the two parts when they are already under the patient. This allows reducing the risky handlings performed on said patient. The use of such a device is particularly indicated in the following cases:

- Victim wounded and suspected of spine trauma, to install them on a vacuum immobilization mattress;
- Impossibility of creating a "simple lift"—"pont simple" in French terminology or a "vertical lift"—"pont amélioré" in French terminology (lowered zone, for example the person is under a train, a vehicle . . . ). This device must also allow lifting a victim without traumatic injury, and without presenting stain or soil (the equipment must be non-oxidizable and easily cleanable). This type of litter simplifies the insertion of the two-part stretcher below the person, but the parts are sometimes complicated to secure together in a strong and sustainable way. However, the gripping of such a litter can also be made more complex, in order not to separate the two parts. Finally, the spoon stretcher does not allow immobilizing a victim, unlike a board or a vacuum mattress. It is just used to lift then transport a victim to a board or a vacuum mattress.

Patent WO1998037848 presents a patient transportation support based on a spoon litter and consists of separable halves, in order to facilitate their positioning under the patient's body. It is designed so as to allow the execution of a radiographic examination. The existing junction zone between the halves and the points where the pivot and locking mechanisms are laterally shifted from the centerline or the longitudinal centerline of the patient support once the latter is assembled.

One of the drawbacks of this device is that the central part, during the lifting, is too thick to prevent the rescuers from moving the victim. The offset hinges impose a thickness high enough to meet the weight constraints increased by the offset of the hinges. In addition, said hinges and their pairing system involve a transverse assembly of the product, which may pinch the lifted person and/or excessively handle them. Indeed, this assembly requires that the victim is moved to the height of the cervical vertebrae, which poses risks to the vertebral column. This handling is moreover contrary to the regulations in Aid techniques. Finally, the fastening means are close to the head and feet of the patient, which can interfere during the assembly of the two parts but also during transportation. These fastening means are generally made of metal, or reinforced with metal and not radiolucent for sustainability reasons, which can cause discomfort during radiography.

Another simple spoon-type litter device is proposed by patent GB2502830, the device having two blades with a shape matching at their longitudinal ends in order to be secured and held by removable straps at the end close to the head of the patient. Once the straps are fastened, their tightening allows their introduction into a depression so as not to hinder the operator. The operation can be complicated depending on the clutter around the patient and the level of emergency of the situation. Indeed, once the blades are secured, the straps, then loose, must be put through the head structure in order to lock the securing of the blades, which can be complex and require dexterity, in addition to being counter-intuitive and long, in particular in emergency situations. The litter is conventionally gripped from the sides, which presents a drawback in cramped situations. Indeed, with this type of litter, it is at the same time necessary to have access to the longitudinal ends in order to assemble the two parts of the litter and put the straps through said ends, and to further have access to the sides of the litter, where the gripping means are located, in order to hoist and transport the person.

Finally, the device described in U.S. Pat. No. 5,803,087 comprises two separable blades without shape matching, which are secured to each other by non-removable linear bars (taken in the mass of the blades), the bars having a central locking means for locking them to each other. These non-removable bars may cause discomfort during a radiography of the patient. In addition, the blades are flat and meet over their entire length, which can pose problems in placing each of the blades on either side of the patient without excessively handling the latter and without moving their head-neck-trunk axis. Finally, the device is gripped on the bars or the sides of the blades, and can therefore be complex once the person has been laid down on the assembly of the blades, particularly in a cramped environment.

This results in a need for a device for lifting, transporting and immobilizing a person, which can be easily handled whatever the environment in which it is used, and whose use is easy and does not cause risks to the health of the patient during their handling, and which proposes a strong and lasting assembly, without the device representing a discomfort during radiography.

DISCLOSURE OF THE INVENTION

The object of the present invention is therefore to propose a device for hoisting and transporting a person, making it possible to overcome at least part of the drawbacks of the prior art.

This aim is achieved by a device for transporting a person, comprising a preferably concave support surface (S) extending in a longitudinal manner, on which a person can be transported, the support surface (S) having two lateral edges, and two longitudinal ends,

- the device further comprising gripping means of the device, and at least one coupling between each of the gripping means and each of the longitudinal ends,
- the device being characterized in that the coupling comprises at least two coupling points including at least one pivot.

According to another feature, the device comprises at least two blades extending along a mainly longitudinal axis (L) between two ends and each comprising two edges, and two longitudinal ends, the blades being configured to be assembled to each other in a reversible manner in an assembly position by at least one coupling between two edges, parallel to the axis (L), in order to form said preferably concave support surface (S) on which a person can be transported, the two longitudinal ends of the support surface (S) being formed by the association of the longitudinal ends of each blade, the coupling between each gripping means and each longitudinal end of the surface being made at the ends of each blade.

According to another feature, the gripping means form assembly means of said assembly position of the blades, the coupling of the gripping means with the longitudinal ends of the surface comprises locking means able to be locked to said ends of the two blades.

According to another feature, each of the gripping means forms a protruding gripping portion, and extends beyond the support surface (S), preferably substantially in the same plane as the surface (S).

According to another feature, the surface formed by the assembly of the two blades comprises an orifice which extends along the longitudinal axis (L) on at least a part of said surface (S).

According to another feature, each blade comprises at each of its two longitudinal ends a protruding member, and each gripping means comprises two ends, each of the ends being complementary to one of said protruding members, and able to be made secured to and locked on one of said protruding members by a locking means.

According to another feature, the protruding members and the locking means are configured to be coupled and locked with each other outside the support surface (S) formed by the assembly of the blades.

According to another feature, each of the ends of the gripping means comprises an arm comprising a locking catch complementary to one of said protruding members, the catch being movable between a closed position, called rest position in which the gripping means is locked on the end of the blade and an open position in which the gripping means is removable, the gripping means preferably further comprising an element for returning the catch to the closed position.

According to another feature, the coupling between two edges of each blade is formed by a pair of couplers, each blade comprising a coupler, preferably one at each longitudinal end of the blades, each coupler of a blade being complementary to a coupler of the other blade, the complementary couplers being preferably a pair formed of a protruding coupling member present on a blade, complementary to a facing orifice on the other blade, the protruding coupling member being housed in the orifice when the blades are in the assembly position.

According to another feature, each blade further comprises gripping means on at least part of an edge of the blade forming a lateral edge of the support surface (S).

According to another feature, the gripping means of the lateral edges of the support surface (S) have preferably specific orifices able to accommodate means for immobilizing part of the person, for example straps for fastening part of the body of the person, and/or an immobilizer of part of the body of a person, for example a head immobilizer.

According to another feature, the blades share a point of symmetry when they are assembled, the point of symmetry being at the center of the longitudinal centerline, coincident with the longitudinal axis (L), of the assembly formed by the two blades.

According to another feature, the device further comprises means for stiffening the blades, preferably spars, more preferably carbon reinforcing tubes, which extend longitudinally inside each of said blades of the device.

According to another feature, the blades comprise at their longitudinal ends at least one additional means for fastening the gripping means to said blades, for example an alcove or a depression, the gripping means being configured to be forcibly introduced into said additional fastening means.

Another aspect of the invention relates to a method for assembling a person transportation device (1), which comprises the following steps:

- Placing successively each of the first and second blades on either side of the person lying on the ground,
- Securing at least one of the gripping means, preferably one of the ends (50) of one of the assembly means, to one of the longitudinal ends (210) of the surface, preferably one of the longitudinal ends (21) of a first blade, by the pivot of one of the coupling points, then securing said gripping means, preferably the other end of the gripping means, to another coupling point, preferably the longitudinal end of the second blade to assemble the two blades, the securing being made by a pivotal movement,
- Repeating the previous operation with the other longitudinal end of the surface (S) to be formed, preferably the other opposite longitudinal ends of the two blades, in order to assemble the two blades under the person in the assembly position, by a pivotal movement, to form a support surface under said person.
- Raising the device to transport the person.

BRIEF DESCRIPTION OF THE FIGURES

Other characteristics, details and advantages of the invention will become apparent upon reading the following description with reference to the appended figures, which illustrates.

DETAILED DESCRIPTION OF THE INVENTION

Figure 1:
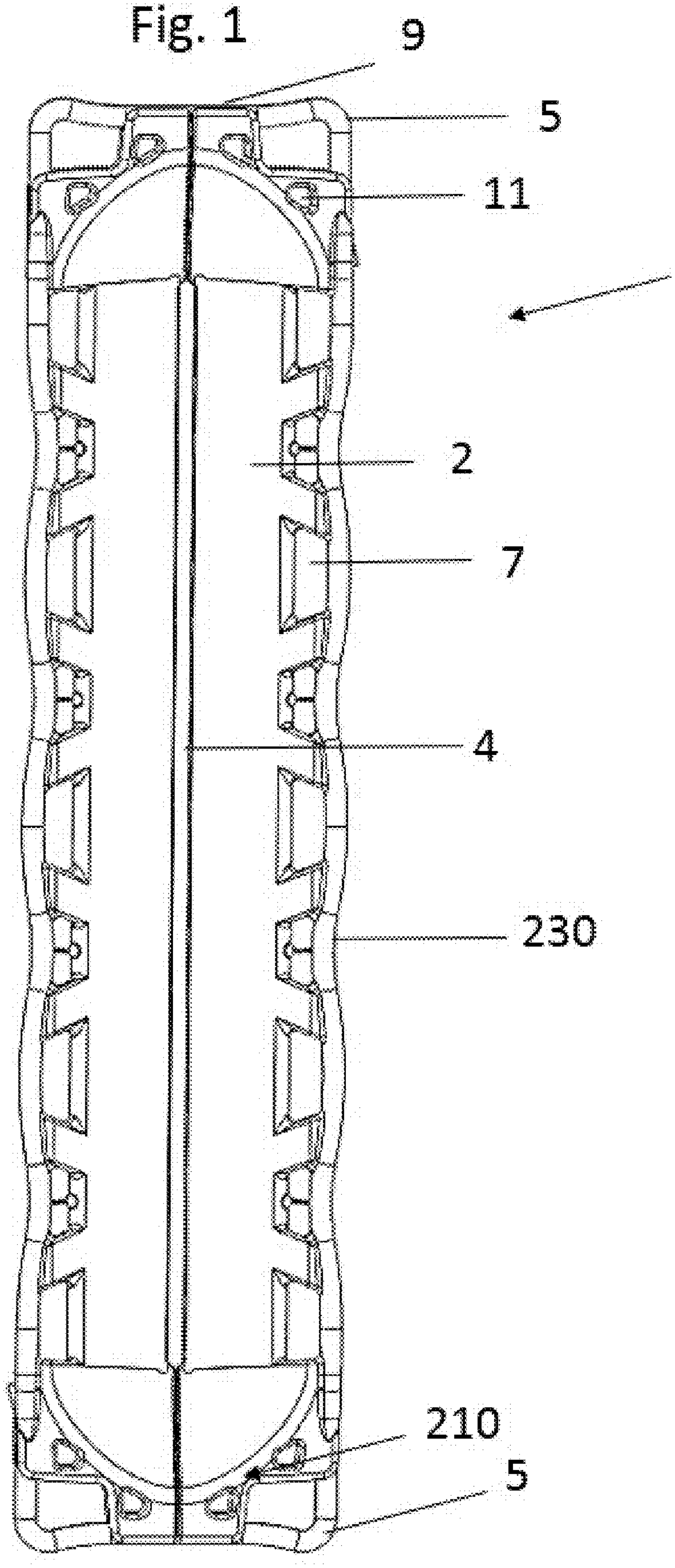
FIG. 1 schematically represents the assembled device in a top view, according to some embodiments.

Numerous combinations can be envisaged without departing from the scope of the invention; those skilled in the art will choose one of them according to the economic, ergonomic, dimensional or other constraints that they will have to respect.

In general, the present invention relates to a device (1) for transporting a person, comprising a preferably concave support surface (S) extending in a longitudinal manner, on which a person (20) can be transported,

- the support surface (S) having two lateral edges (230), and two longitudinal ends (210),
- the device (1) further comprising gripping means (5) of the device (1), the gripping means being removable relative to said device, the device further having at least one coupling between each of the gripping means (5) and each of the longitudinal ends (210),
- the device (1) being characterized in that the coupling comprises at least two coupling points including at least one pivot.

Preferably, the coupling is configured such that each gripping means can be coupled by a pivotal movement from a first coupling point to the second coupling point.

It is important to note that such a transportation device can be used by rescuers at the same time as a litter having a function of lifting and transporting a person, and as a board having a function of immobilizing the person. In other words, the person can remain on the device during their transportation to the hospital, for example by ambulance, without needing to transfer them to another means such as a board or a vacuum immobilization mattress.

The removable coupling allows for less clutter both during transportation and during placement of the device under the patient.

In some embodiments, said coupling of the gripping means with the longitudinal ends (210) of the surface further comprising locking means (51) able to lock said gripping means to said coupling points of said ends (210).

This advantageously allows locking the gripping means regardless of the gripping direction and the applied force. Preferably, the locking means comprise a clip, a catch or any other means that allows reversibly locking the gripping means, regardless of the direction of the force applied to said gripping means.

In some embodiments, the gripping means (5) have a length less than 50%, preferably 25%, of the length of the support surface (S). This allows reducing the clutter of the device, particularly during the assembly of the device, but also during the transportation of the device, before assembly in particular.

In some embodiments, the gripping means (5) do not extend into the support surface (S) over a length greater than 50%, preferably 25% of the length of said support surface (S). This advantageously allows reducing the clutter of the device, particularly during the assembly of the device.

In some embodiments, each of the gripping means (5) forms a protruding gripping portion, and extends beyond the support surface (S). This advantageously allows proposing an additional gripping zone offset relative to the support surface (S) and to the person, which can improve and simplify the person management in tight spaces. In some embodiments, the protruding gripping portion (5) extends substantially in the same plane as the support surface (S). In other embodiments, the protruding gripping portion extends into another plane, which in some situations allows facilitating the gripping.

Preferably, the gripping means (5) of the device (1) are stiff, which allows facilitating their gripping and their coupling to the longitudinal ends (210) of the surface (S) by a pivot.

In some embodiments, the pivot comprises an axis of rotation substantially perpendicular to the plane of the surface (S).

By "substantially", it is meant "approximately perpendicular". In all cases, the pivot always has an axis of rotation perpendicular to the coupling plane.

In some embodiments, the device (1) comprises at least two blades (2) extending along an axis (L) mainly longitudinal between two ends and each comprising two edges (22, 23), and two longitudinal ends (21),

- the blades (2) being configured to be assembled to each other in a reversible manner in an assembly position by at least one coupling (3) between two edges (22), parallel to the axis (L), in order to form said preferably concave support surface (S) on which a person can be transported, the two longitudinal ends (210) of the support surface (S) being formed by the association of the longitudinal ends (21) of each blade (2), the coupling between each gripping means (5) and each longitudinal end (210) of the surface being made at the ends (21) of each blade (2).

The longitudinal axis "L" crosses the surface formed by the two blades at its longitudinal centerline.

Advantageously, the presence of two separable blades or spars allows lifting the person in accordance with the regulations that is to say without moving their cervical vertebrae and their vertebral column, commonly called in First Aid "the head-neck-trunk axis".

It is thus sufficient to couple a first end of a gripping means to one end of a first blade, then to connect said gripping means to the end of a second blade, by a pivotal movement.

In some embodiments, the gripping means (5) form assembly means of said assembly position of the blades, the coupling of the gripping means with the longitudinal ends (210) of the surface comprises locking means able to be locked to said ends (21, 210) of the two blades (2).

The device thus advantageously allows for a locking means which allows being coupled to the ends of a surface formed by two blades to allow at the same time i) its assembly, ii) its gripping and iii) the locking of the coupling and therefore of the assembly. This thus allows a robust assembly in several steps, which thus allows pre-assembling the device by a first coupling (3) between each of the blades, then a final assembly by the coupling of the locking means to the ends of said blades in order to stiffen and make said assembly safer. The final assembly can then be raised by said locking means. Thus, in an environment with a high clutter, the fact of being able to assemble the blades first by a first coupling, then the means for gripping the blades by a second coupling allows a simplification of the use, a characteristic often relevant in urgent situations, which is often the case when using a device of this type. It is also easier and faster to perform the assembly, when the device has been assembled directly under the patient to be transported.

In some embodiments, the gripping means (5) have a length less than 25% of the length of the support surface (S). This allows reducing the clutter of the device, particularly during the assembly of the device, but also during the transportation of the device, in particular before assembly.

In some embodiments, the gripping means (5) do not extend into the support surface (S) over a length greater than 25% of the length of said support surface (S). This advantageously allows reducing the clutter of the device, particularly during assembly of the device.

In some embodiments, the device (1) includes, in the assembly position, a space between said surface and each of the gripping means, in particular by a notch on each of the blades in the vicinity of the points where said gripping means (5) are made secured to the ends (21) of the blades (2).

It is understood that the surface (S) formed by the assembly of the two longitudinal blades extends along the longitudinal axis (L) substantially on a support plane (X), the longitudinal axis (L) being a line contained in the plane (X).

Preferably, the protruding gripping portion can be gripped regardless of the gripping direction. This is facilitated when the protruding gripping portion has a recess. This advantageously allows simplifying the gripping of the device (1), regardless of the clutter around it (in a damaged car, under a train or under debris, etc.)

It is understood by "support surface" a surface whose size and shape are at least able to support the body of a person.

The fastening of the gripping means to the longitudinal ends (210) of the support surface allows the grip to be away from the body of the person. Since the coupling is reversible, the gripping means can be made of non-radiolucent metal, and can be removed before having the radiography, thus making radio compatible the assembly of the blades on which the person is lying.

The coupling (3) of the blades, preferably by couplers (3, 31, 32), is made at the ends (21) of the blades (2) so as not to be under the person. Thus, this allows the operator to visually confirm the correct coupling of the blades. This avoids having to perform a complex handling of the person and the blades to form the support surface, and furthermore not to perform it blindly.

In addition, the offsetting of the gripping means (5) allows not having to perform a complex handling of the person and of the blades to assemble and carry said blades (2), the coupling of the gripping means (5) with said blades (2) then representing no risk for the person. In this way, the operator, usually a rescuer, has a visual on the entire operation, without ever working blindly, which further reduces the risks of worsening the situation of the person.

In some embodiments, the surface formed by the assembly of the two blades comprises an orifice (4) which extends along the longitudinal axis (L) on at least part of said surface (S).

Advantageously, this allows placing the blades more easily on each side and assembling them without any risk of pinching the body of the person. It also allows a visual examination of the back of the person, at the orifice once it is placed on the device (1) and lifted. It is understood by "orifice" any open area or open surface which may have different shapes. Thus, the orifice may have a circular, oblong, rectangular or any other shape which allows improving the visual examination of the person without any risk of pinching them during the assembly of the blades, and while maintaining good resistance to stress constraints due to the weight of the person.

Preferably, the size of the orifice can vary between 100 and 180 cm in length preferably between 120 and 160 cm, more preferably 139 cm, and between 1 and 6 cm in width, preferably 1.5 and 3 cm, still preferably 2 cm. The orifice (4) is preferably oblong in shape.

In some embodiments, as for example illustrated in a non-limiting manner in FIG. 1, the assembly of the two blades (2) of the device (1) by couplers (31, 32, FIGS. 2A and 3) forms a litter device (1) comprising a support surface (S) on which a person can be lying. The operators can raise and carry the device (1) by the gripping means (7) formed by openings along the lateral edges (230) of the surface (S) of said device, or by the gripping means (5) disposed at each end of the device.

In some embodiments, the surface is slightly concave in order to improve the comfort of the person. In some combinable and non-limiting embodiments, the inclination of the concave surface is low at the location of the person's head in order to improve comfort.

In some embodiments, the device has a length measuring between approximately 175 cm and 220 cm, preferably between approximately 185 and 195 cm, and a width measuring between approximately 40 and 60 cm, preferably between 45 and 55 cm.

Thus, the blades (2) each comprise at least a central longitudinal edge (22) and a lateral longitudinal edge (23), the coupling (3) being made at the central longitudinal edges (22), and the free lateral longitudinal edges (23) forming the lateral longitudinal edges (230) of the surface (S).

In some embodiments, each blade (2) comprises at each of its two longitudinal ends (21) a protruding member (51), and each gripping means (5) comprises two ends (50), each of the ends (50) being complementary to one of said protruding members (51), and able to be made secured to and locked on one of said protruding members (51) by a locking means (52).

The fact of doubling the securing and locking means and of offsetting them allows stiffening the assembly without the blades having a very large thickness.

Figure 2:
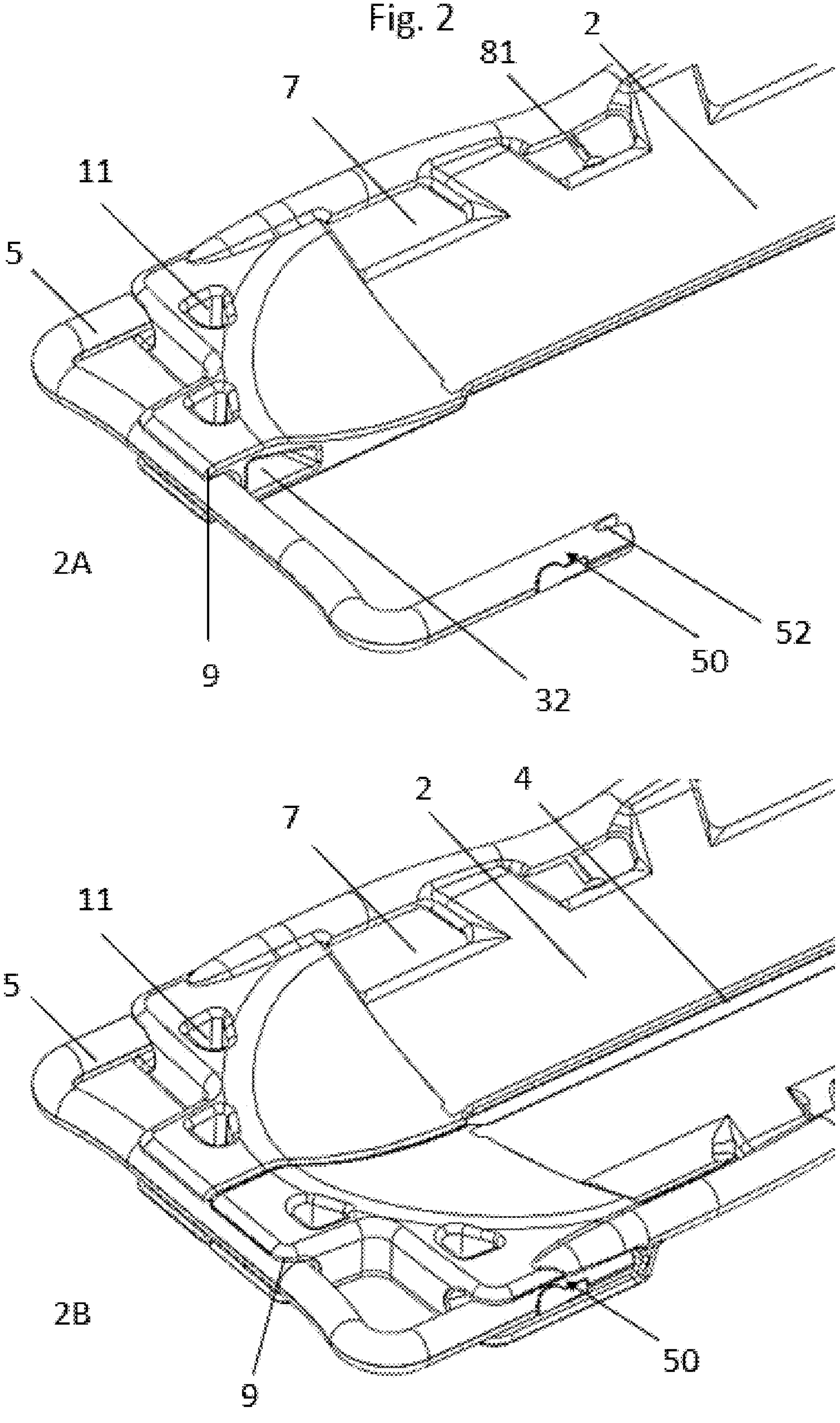
FIG. 2 schematically represents part of the device unassembled (2A) and assembled (2B), according to some embodiments.

More particularly, FIG. 2A illustrates a non-limiting exemplary embodiment of the present invention, in which a locking means (5), forming an arch, locks the assembly of the two blades (2). The arch (5) comprises one end (50) forming an arm and is locked on a protruding member (51) of the blade (2) by means of a catch (52) which clamps said protruding member (51).

Figure 3:
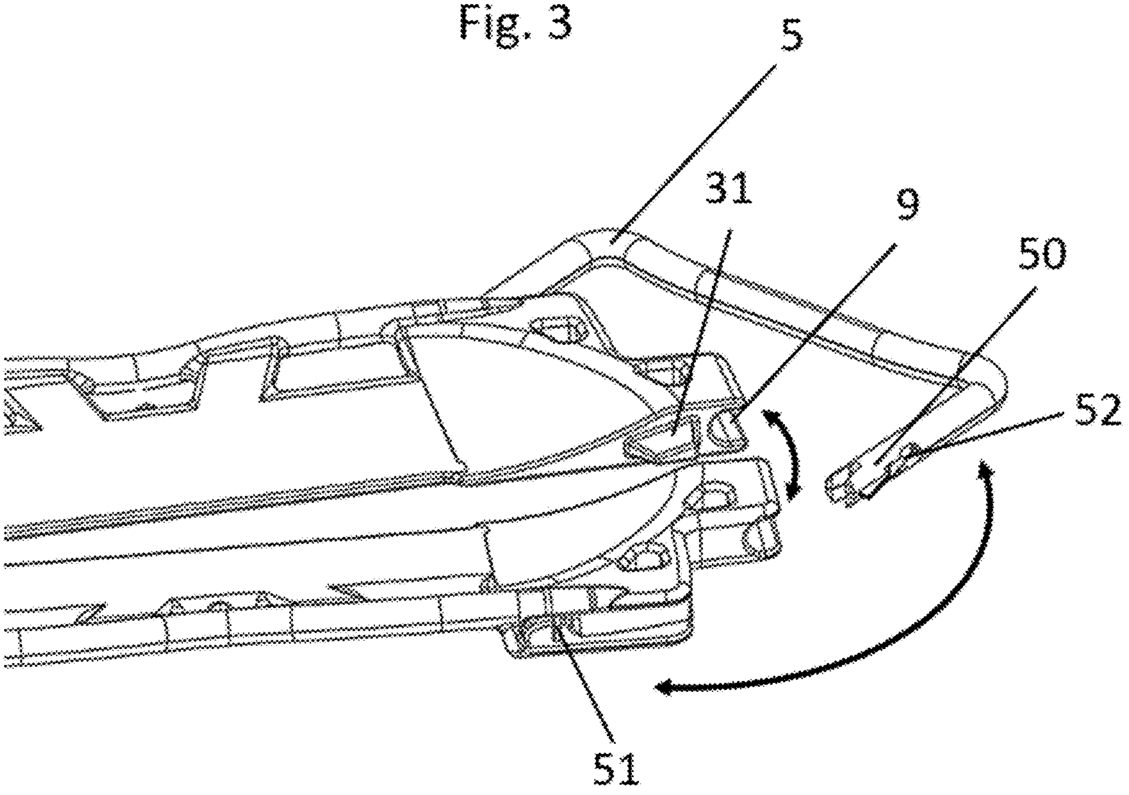
FIG. 3 schematically represents part of the device unassembled, according to some embodiments.

In some embodiments, as for example illustrated in a non-limiting manner in FIGS. 2A, 2B and 3, the device further comprises an additional means (9) for fastening the gripping means (5), for example an alcove or a depression present at each longitudinal end of the support surface (210), on the section of the device, the gripping means (5) being configured to be forcibly introduced into said additional fastening means (9). Preferably each blade (2) comprises an additional fastening means (9).

This allows stiffening the assembly of the blades (2) with the gripping means, in addition to the locking of the gripping means on said blades (2). Advantageously, this also allows distributing the stress constraints over the entire periphery of the longitudinal ends (21) of the blades (2) rather than concentrating it on the gripping points.

As shown in FIG. 3, it is possible to forcibly introduce the gripping means (5) into the additional fastening means (9), by pivoting it after having locked it on one side on a protruding member (51) of a blade (2), the protruding member (51) then representing the pivot point. The fastening means (9) thus allows the device (1) to have an additional fastening in addition to the protruding members (51) complementary to the locking means (52).

Figure 4:
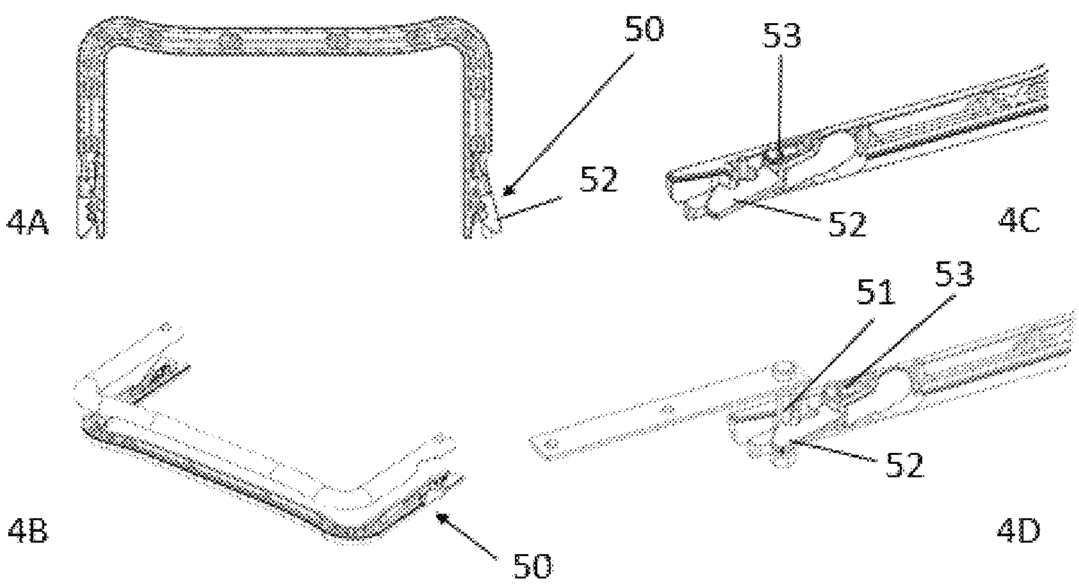
FIG. 4 schematically represents one of the locking means according to some embodiments.

In some embodiments, as for example illustrated in a non-limiting manner in FIGS. 4A and 4B, the gripping means (5) forming a protruding gripping portion can be produced by molding in which is produced a rib network (54) optimized to improve resistance to stress constraints without significantly increasing the weight. The gripping means (5) can be formed of two independently molded parts.

In some embodiments, as for example illustrated in a non-limiting manner in FIG. 4C, each of the ends (50) of the gripping means (5) comprise an arm comprising at least one locking catch (52), complementary to one of said protruding members (51), the catch (52) being movable between a closed position, called rest position, in which the locking means is locked and an open position in which the locking means is removable. Preferably, the locking means (52) further comprises an element for returning the catch (52) to the closed position, for example a spring. This allows the operator, for example a rescuer, to easily and sustainably lock and unlock the locking means (52) during the assembly. Preferably, the locking means comprises a locking indicator, for example a visual indicator or an audible indicator. Preferably, the locking means (52) comprises an audible indicator such as a locking ratchet able to emit a sound when it is locked, for example by clipping.

In some preferred embodiments, the protruding members (51) and the locking means (52) are configured to be coupled and locked with each other outside the support surface formed by the assembly of the blades (2). This advantageously allows the operator to make the coupling without being hindered by the person and without having to handle them.

In some embodiments, as for example illustrated in a non-limiting manner in FIGS. 2A and 3, each blade (2) comprises a coupling (3), preferably at each longitudinal end of the blade (21), each coupling (3) being formed of a coupler of a blade complementary to a coupler of the other blade in order to allow the assembly of the two blades (2), the complementary couplers (31, 32) forming preferably a pair formed of a protruding coupling member (31) present on a blade, complementary to a facing orifice (32) on the other blade, the protruding coupling member (31) being housed in the orifice (32) when the blades (2) are in the assembly position. In some embodiments, it is introduced forcibly and/or by clipping. In other embodiments, the protruding member (31) is produced by clamping. Preferably, the couplers (31, 32) are configured to be coupled outside the support surface formed by the assembly of the blades (2).

Advantageously, this allows the operator to make the coupling without being hindered by the person, and without having to handle them.

In some embodiments, each blade (2) further comprises gripping means (7) on at least part of an edge (23) of the blade (2) forming a lateral edge (230) of the support surface (S). This allows having additional gripping means and simplifying the catching and hoisting of the device.

In some embodiments, the gripping means (7) of the lateral edges (230) of the support surface (S) have preferably specific orifices (11) able to accommodate means for immobilizing part of the person, for example straps allowing fastening part of the body of the person, and/or an immobilizer of part of the body of a person, for example a head immobilizer.

Advantageously, in the case where the two blades (2) are symmetrical, identical orifices are present at a zone intended to accommodate the feet of the person.

These fasteners allow immobilizing the body of the person, reducing the risk of worsening their health. Thus, retention straps can be used to immobilize the person at the thorax, the pelvis and the lower limbs, said straps passing through the orifices of the gripping means (7). The fastening means can also allow fastening an immobilizer, for example a head immobilizer. In other embodiments, the head immobilizer itself consists of straps. In other preferred embodiments, the immobilizer is composed of a head cushion fixed on the surface and possibly of two lateral immobilization blocks, and of at least 2 straps for maintaining the head in the forehead and the chin. Advantageously, the fastening means can also allow stiffening and solidifying the assembly of the two blades (2).

In some embodiments, the blades (2) share a point of symmetry when assembled, the point of symmetry being at the center of the longitudinal centerline of the assembly formed by the two blades (2).

Advantageously, this allows proposing an intuitive assembly, without needing to take into account a potential direction of the blades (2), which is important in emergency situations, which are often emergency situations in which rescuers must act quickly. In addition, this allows simplified manufacture of the blades (2), a single type of mold being sufficient to manufacture the two blades (2) of the device.

Preferably, the gripping means (5) are also identical on either side of the blades (2).

In some embodiments, the gripping means (5) form U's, each end of which connects a longitudinal end of a blade (2) in order to connect and lock together the two longitudinal ends of two different blades (2).

Figure 5:
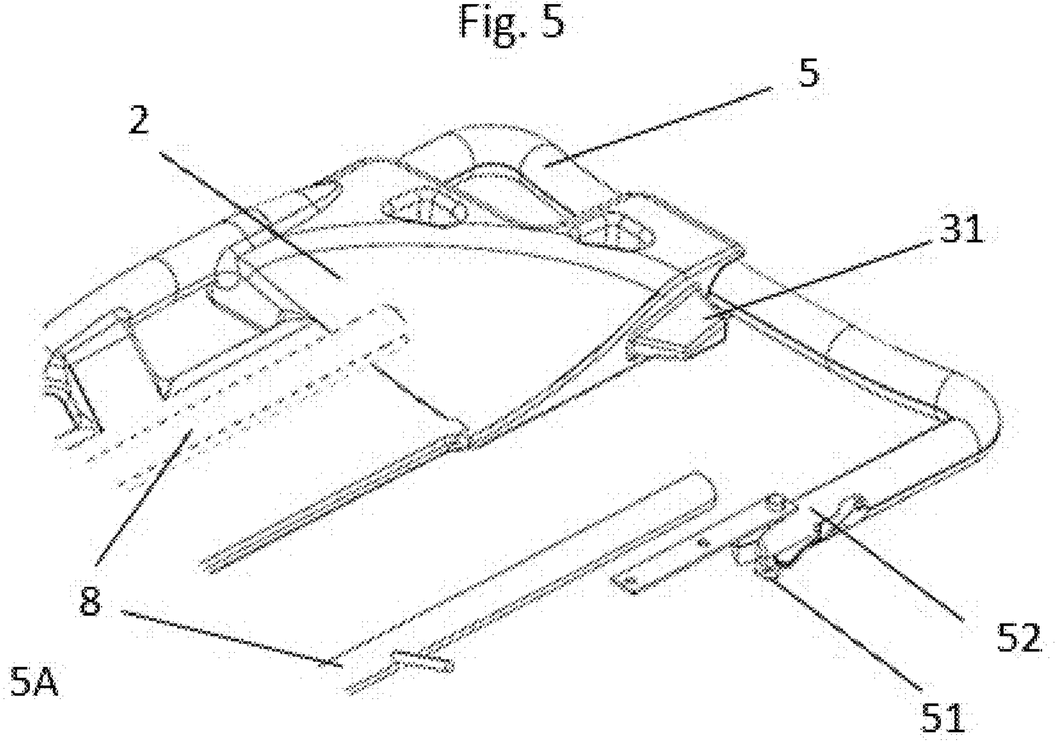
FIG. 5 schematically represents part of the device according to some embodiments in perspective (5A, unassembled) and in sectional view (5B, assembled).
Figure 5:
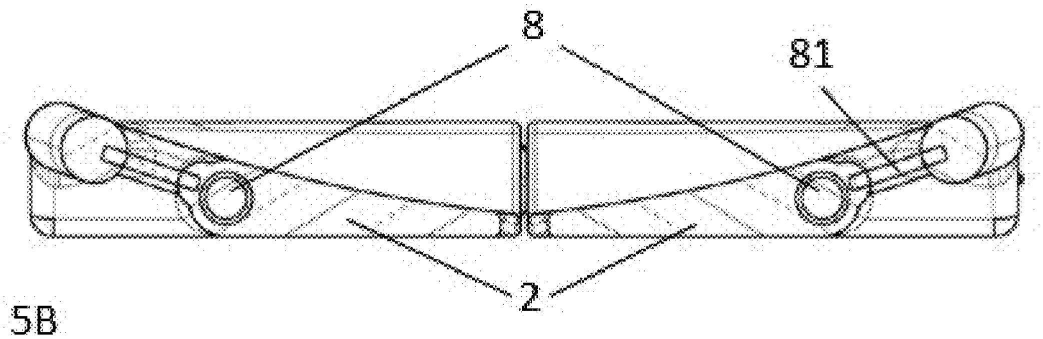

In some embodiments, as illustrated by way of example and in a non-limiting manner in FIGS. 5A and 5B, the device further comprises stiffening means (8), preferably spars, preferably carbon reinforcing tubes, which extend longitudinally in each of the blades (2) of the device.

In some embodiments, the stiffening means (8) extending longitudinally in each of the blades (2) of the device are non-removable and radiolucent, which allows not hindering the radiology.

The stiffening means (8) can be made of carbon fiber, or any other material strong enough to allow the stiffening of the blades (2) while being preferably radiolucent.

The blades (2) can comprise other stiffening means (81), for example means (81) for stiffening the gripping zones on the periphery of the surface S, as illustrated by way of example and without limitation in FIGS. 2A and 5B. These additional stiffening means (81), also called stiffening inserts (81) can be formed in different materials as needed. Preferably, they are made of PEEK (thermostable plastic, polyetheretherketone). In some embodiments, they can also allow fastening and holding in place the stiffening means, for example spars (8).

The protruding members forming rods (51) on which the locking catches (52) of the ends (50) of the gripping means (5) will be fastened can be overmolded in each blade, as illustrated by way of example in FIG. 5A. Preferably, said protruding members (51) are not removable.

It is easily understood that a catch (52) and a protruding member (51) can be substituted for each other. In other words, in some embodiments, the catch (52) may be present on the blade while the complementary protruding member (51) may be present at the end (50) of the gripping means (5).

In some situations, it may be interesting to be able to increase the support surface for a person, for example when the latter is particularly tall.

In some embodiments, the gripping means (5) further comprise an additional support surface (10) to increase the support surface (S) on which a person can be transported, for example by forming a footrest or a headrest. This additional support surface (10) may or may not be removable relative to said gripping means (5). In the embodiments where the additional support surface (10) is removable, it can be coupled to the gripping means (5) by being forcibly introduced, clipped or even screwed, for example to the parts of the gripping means (5) parallel to the lateral edges of the blades (2), or to the ends of the gripping means (5) opposite to those which are locked on the blades.

In some embodiments, the additional support surface (10) comprises a gripping zone formed by a recess or a depression.

It is possible to add a means for stiffening the additional support surface (10). This stiffening means (not represented) can for example be a rigid U-shaped bar fastened parallel to the lateral edges of the blades (2) and to the gripping means (5) comprising the additional support surface (10). This fastening can be made by being forcibly introduced, clipped or fastened by fastening means such as screws. The fastening can for example be carried out by clipping by a pivotal movement.

It may also be advantageous to add an additional piece forming an additional support surface (10) on one of the central ends of the surface (S). This piece can be held fastened by straps, like a head immobilizer, or by a Velcro-type attachment means (registered trademark), a Velcro zone being for example attached to part of the surface (S) by straps, and the additional piece comprising a Velcro zone able to hook onto the Velcro zone of the surface (S).

In some embodiments, the gripping means (5) comprise orifices configured to accommodate additional gripping means (5), gripping means (5) comprising an additional support surface (10), or another piece forming additional support surface (10). The additional gripping means (5) may themselves comprise orifices configured to accommodate other gripping means (5). Advantageously, this virtually allows increasing the support surface at will, additional stiffening means being further able to be added to part of the gripping means in order to stiffen the assembly. The fastening of the gripping means can be carried out by clipping, by a pressure ball like the system for adjusting the length of the crutches. In another embodiment, the fastening and locking system is similar to the one used to lock the gripping means (5) to the ends of the blades (2), as illustrated by way of example and without limitation in FIG. 5.

The additional support surface (10) can be formed as a single unitary piece or in several preferably two parts particularly to form a footrest. In the case of a two-part surface, they can be independent of each other, and fastened on each branch of the gripping means (5) forming an arch.

Those skilled in the art will easily understand that the additional piece can comprise gripping means, which can extend beyond the support surface S.

In some embodiments, the piece forming additional support surface (10) may be formed of a zone forming additional support surface (10), and of two parallel and corrugated branches so that they are configured to be fastened to the longitudinal ends of the blades by passing above the gripping means and below the ends of the blades. This has the advantage of improving the mechanical strength of the piece thanks to a lever effect.

In some embodiments, as illustrated in a non-limiting manner in FIGS. 7A-7G, the additional support surface (10) is removably fastened on said gripping means (5) of said assembly position of the blades (2). Said additional support surface (10), also called extension, comprises at least one fastening system on the gripping means (5) of said assembly position of the blades (2). The extension can thus comprise a recessed part whose shape is complementary to that of the gripping means (5), as illustrated in a non-limiting manner in FIGS. 7B-7C. The fastening can be carried out by snap-fitting on one of the gripping means (5) forming arches to obtain very good mechanical strength.

Figure 7:
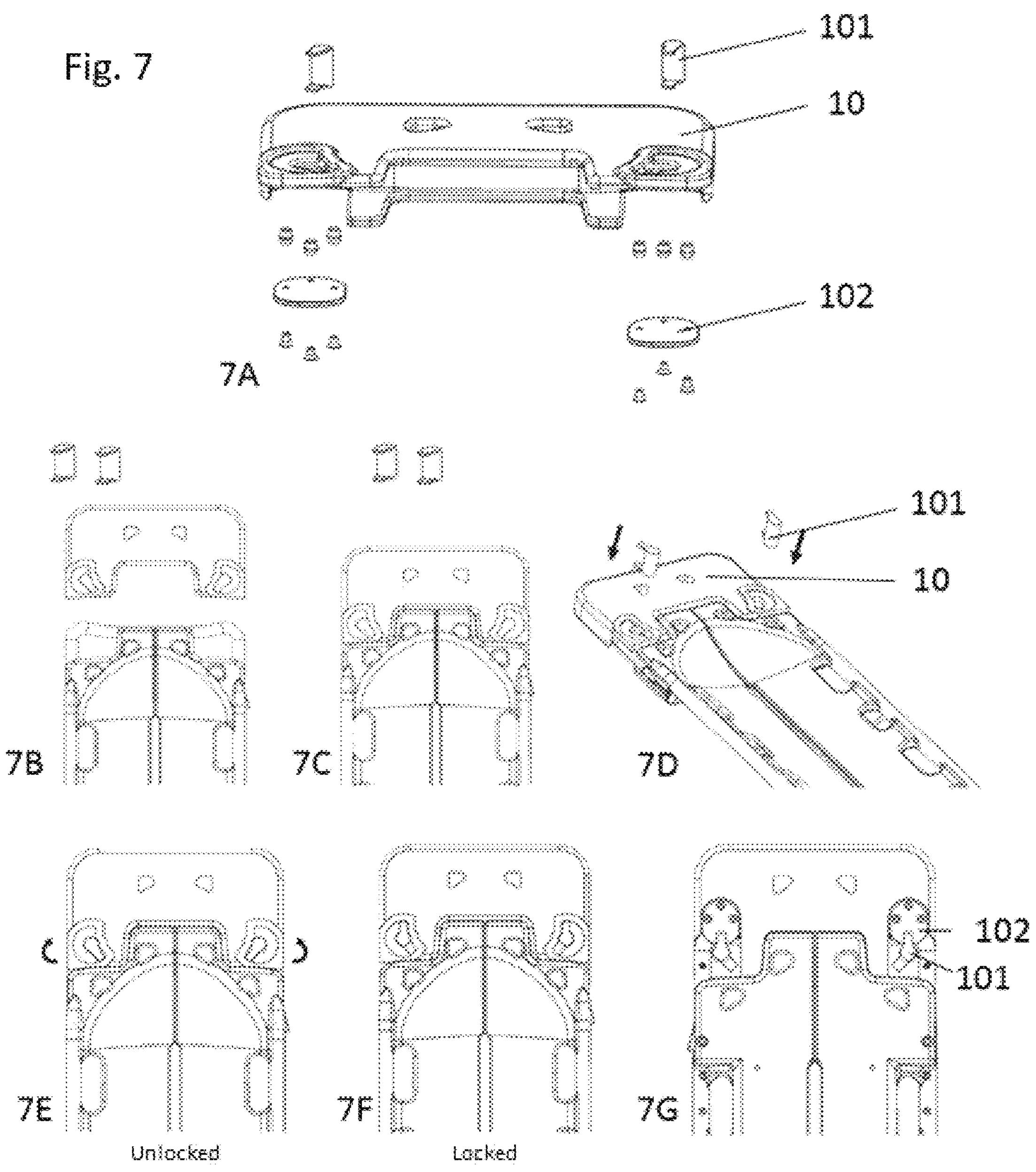
FIG. 7 schematically represents part of the device comprising an additional support surface according to some embodiments (FIGS. 7A to 7G).

In some embodiments, in which the gripping means (5) comprise a protruding gripping portion having a recess, a latch (101) can be introduced into said recess, as illustrated in FIG. 7D, to block and fasten the additional support surface (10) on the gripping means (5), for example in a non-limiting manner, to fasten the snap-fitting. In some embodiments, the lock has parallel arms and is configured to lock the extension (10) on the gripping means (5) by rotation of said lock (101) from an unlocking position (FIG. 7E) into a locking position of the extension, as illustrated in FIG. 7F, said arms then being blocked in translation between a plate for locking (102) and the extension (10), as illustrated in FIG. 7G.

In some embodiments, the assembled latch (101) has a thickness greater than the thickness of the extension (10). This allows easier handling of the lock.

In some embodiments, at least the blades (2) are X-ray translucent. In some embodiments, the blades (2) and the stiffening means (81) are X-ray translucent. This advantageously allows taking a radiography of the person without having to remove the device (1) on which it rests.

The materials that make up the device must also be water resistant, non-oxidizable and easily cleanable, so as not to present any stain or soil. Indeed, the absorption of biological fluid or blood by the equipment must not be possible in order to avoid the transmission of infectious germs.

In some embodiments, the method for assembling a person transportation device (1) as described above, comprises the following steps:

- Placing successively each of the first and second blades (2) on each side of the person lying on the ground,
- Securing at least one of the gripping means (5), preferably one of the ends (50) of one of the gripping means (5), to one of the longitudinal ends (210) of the surface, preferably one of the longitudinal ends (21) of a first blade, by a first coupling point, then securing said gripping means (5), preferably the other end (50) of the gripping means (5), to a second coupling point of the end (210), preferably to the coupling point of the longitudinal end (21) of the second blade (2) to assemble the two blades (2), the securing being made by a pivotal movement,
- Repeating the previous operation with the other longitudinal end (210) of the surface (S) to be formed, preferably the other opposite longitudinal ends (21) of the two blades (2), in order to assemble the two blades (2) under the person in the assembling position, by a pivotal movement, to form a support surface (S) under said person.
- Raising the device (1) to transport the person.

It is thus sufficient to couple a first end of a gripping means to one end of a first blade then to connect said gripping means to the end of a second blade, by a pivotal movement.

Figure 6:
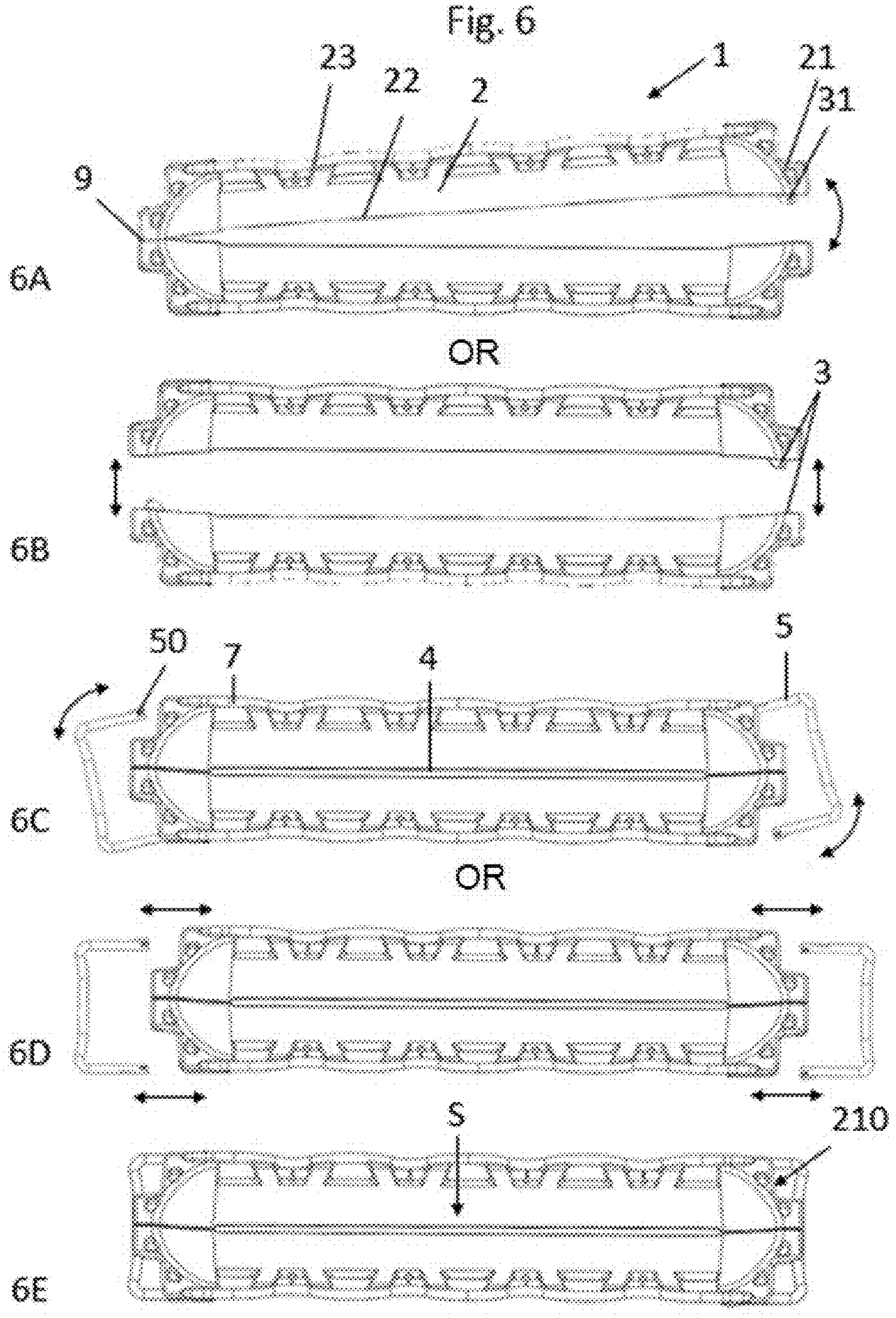
FIG. 6 schematically represents several methods for assembling and using the device according to some embodiments.

FIG. 6 illustrates, for example and in a non-limiting manner, a possible method for assembling the person (20) raising and transportation device. The blades (2) are first separated (FIG. 6A). The two blades (2) can be assembled at one of their ends, for example forming the part intended to receive the head of a person, thanks to a gripping means (5). The gripping means (5) is coupled, preferably by a first end (50), to one end (21) of a blade (2) (FIG. 6B). By a pivotal movement, the gripping means (5) is brought into contact and is coupled to a second end of a blade (2) to secure the two blades (2) in order to form an end of the surface (210) (FIG. 6C). The same operation is repeated at the opposite ends (21), for example forming the part intended to receive the feet of a person, (FIGS. 6D and 6E) in order to assemble the blades in the assembly position. It is also possible to first couple the two blades (2) forming the surface (S) of the device, then to assemble the gripping means (5) at the ends (21) of the blades (2).

In some embodiments, each of the coupling points comprises a pivot point. Thus, in some embodiments as illustrated in FIG. 6, the device (1) comprises a coupling (3) which comprises two coupling points at each longitudinal end (210) of the surface (S), preferably one at each longitudinal end (21) of each blade (2), each of the coupling points having a pivot point. Thus, the gripping means (5) can be fastened at a longitudinal end (21) of any blade then can be fastened at a second longitudinal end (21) by a pivotal movement.

The gripping means can be made of wood, metal, carbon fiber or another light and stiff material. Preferably, it is made of aluminum and forms a recessed bar, which preferably comprises reinforcing ribs. The lock can be made of metal, preferably aluminum and stainless steel.

The following table shows possibilities of manufacture of the various elements constituting the device. Each characteristic detailed in this table can be taken independently of the other characteristics listed, and those skilled in the art will thus understand that each characteristic can be combined without limitation with another one, present in the table or described previously.

TABLE 1

| Designation | Characteristics/ tools | Material |
|---|---|---|
| Blades, Half-litter | Rotational molding Foaming | High density polyethylene (widely proven process/ material for boards manufactured and sold worldwide) |
| Gripping means: Arches | Injection | Steel with a shot-blasted finish (ribs) Or carbon fiber |
| Catch | Injection | Steel with a shot-blasted finish (ribs) |
| Insert (rod complementary to the catch) | | Crude steel |
| Carbon tube | Filament winding | Carbon compatible with a rotational molding process at a peak temperature of 220° C. (Temperature above 120° Celsius for about 20 minutes). |
| Insert | | polyetheretherketone, thermostable semi-crystalline thermoplastic, very high temperature |

Asperities or cavities can be added at the gripping zones in order to improve the grip. These asperities or cavities can be made in the same material, or in another material, for example non-slip material such as rubber.

Those skilled in the art will easily understand upon reading the present application that by "longitudinal ends" of the blades (2) it is meant zones at the end of the blades (2) which can include several different elements, such as for example a coupler (3), a protruding member (51) on which an arch (5) can be locked, and an additional fastening means (9), said different elements being able to be separate from each other, and preferably being so. However, those skilled in the art will easily understand that in some cases, the same element can fulfill several characteristics described above.

It will be easily understood upon reading the present application that the features of the present invention, as generally described and illustrated in the figures, can be arranged and designed in a wide variety of different configurations. Thus, the description of the present invention and the related figures are not intended to limit the scope of the invention but simply represent selected embodiments.

Those skilled in the art will understand that the technical characteristics of a given embodiment can indeed be combined with characteristics of another embodiment, unless the reverse is explicitly mentioned or unless it is not obvious that these characteristics are incompatible. In addition, the technical characteristics described in a given embodiment can be isolated from the other characteristics of this mode unless the reverse is explicitly mentioned.

It should be obvious to those skilled in the art that the present invention allows embodiments in many other specific forms without departing from the field defined by the scope of the appended claims, they should be considered as illustration and the invention should not be limited to the details given above.

LIST OF THE REFERENCE SIGNS

1. Transportation device
2. Blade
21. Longitudinal end of the blade
210. Longitudinal end of the surface
22. Central longitudinal edge of the blade
23. Lateral longitudinal edge of the blade
230. Lateral edge of the surface
3. Coupling
31. Protruding member for coupling
32. Complementary orifice
4. Orifice/open area
5. Gripping means
50. End of the gripping means
51. Locking means: Protruding member (Rod)
52. Locking catch
53. Return element
7. Gripping means
8. Stiffening means
81. Stiffening insert
9. Additional fastening means
10. Additional support surface
101. Lock
102. Plate for locking
11. Specific orifice

The invention claimed is:

1. A device for transporting a person, comprising a concave support surface extending in a longitudinal manner, on which a person can be transported, the concave support surface having two lateral edges, and two longitudinal ends, the device further comprising, at each of said longitudinal ends, gripping means of the device, the gripping means being removable relative to said device, the device further having, at each of said longitudinal ends, at least one coupling comprising a first coupling point between the gripping means and the longitudinal ends and a second coupling point between said gripping means and said longitudinal ends, the first coupling point including at least one pivot, such that said gripping means can be coupled to said longitudinal end at the first coupling point, said coupling at the first coupling point allowing a pivotal movement of said gripping means around the first coupling point for coupling said gripping means to said longitudinal end at the second coupling point, said coupling of the gripping means at each of said longitudinal ends further comprising locking means able to lock said gripping means to said first and second coupling points of said longitudinal ends.

2. The device according to claim 1, wherein each of the gripping means forms a protruding gripping portion, and extends beyond the concave support surface, substantially in the same plane as the concave support surface.

3. The device according to claim 1, wherein the gripping means have a length less than 50% of the length of the concave support surface.

4. The device according to claim 1, comprising at least two blades extending along a mainly longitudinal axis between two ends and each comprising two edges, and two longitudinal ends, the blades being configured to be assembled to each other in a reversible manner in an assembly position by at least one coupling between two edges, parallel to the longitudinal axis, in order to form said concave support surface on which a person can be transported, the two longitudinal ends of the concave support surface being formed by the association of the longitudinal ends of each blade, the coupling between each gripping means and each longitudinal end of the concave support surface being made at the longitudinal ends of each blade.

5. The device according to claim 4, wherein the gripping means form assembly means of said assembly position of the blades, the coupling of the gripping means with the longitudinal ends of the concave support surface comprises locking means able to be locked to said longitudinal ends of the two blades.

6. The device according to claim 4, wherein the concave support surface formed by the assembly of the two blades comprises an orifice which extends along the longitudinal axis on the at least part of said concave support surface.

7. The device according to claim 4, wherein each blade comprises at each of its two longitudinal ends a protruding member, and each gripping means comprises two ends, each of the ends being complementary to one of said protruding members, and able to be made secured to and locked on one of said protruding members by a locking means.

8. The device according to claim 7, wherein each of the ends of the gripping means comprises an arm comprising a locking catch complementary to one of said protruding members, the catch being movable between a closed position, called rest position in which the gripping means is locked on the longitudinal end of the blade and an open position in which the gripping means is removable.

9. The device according to claim 4, wherein the protruding members and the locking means are configured to be coupled and locked with each other outside the concave support surface formed by the assembly of the blades.

10. The device according to claim 4, wherein the coupling between two edges of each blade is formed by a pair of couplers, each blade comprising a coupler, one at each longitudinal end of the blades, each coupler of one blade being complementary to a coupler of the other blade, the complementary couplers being a pair formed of a protruding coupling member present on a blade, complementary to a facing orifice on the other blade, the protruding coupling member being housed in the orifice when the blades are in the assembly position.

11. The device according to claim 4, wherein each blade further comprises gripping means on at least part of an edge of the blade forming a lateral edge of the concave support surface.

12. The device according to claim 11, wherein the gripping means of the lateral edges of the concave support surface have specific orifices able to accommodate means for immobilizing part of the person and/or an immobilizer of part of the body of a person.

13. The device according to claim 4, wherein the blades share a point of symmetry when they are assembled, the point of symmetry being at the center of the longitudinal centerline, coincident with the longitudinal axis, of the assembly formed by the two blades.

14. The device according to claim 4, wherein the device further comprises means for stiffening the blades which extend longitudinally inside each of said blades of the device.

15. The device according to claim 4, wherein the blades comprise at their longitudinal ends at least one additional means for fastening the gripping means to said blades, the gripping means being configured to be forcibly introduced into said additional fastening means.

16. The device according to claim 4, wherein the gripping means further comprise an additional support surface.

17. The device according to claim 16, wherein the additional support surface is removably fastened on the gripping means.

18. A method for assembling a person transportation device according to claim 4, wherein the method comprises the following steps:

placing successively each of the first and second blades on either side of the person lying on the ground, securing one of the ends of one of the gripping means to one of the longitudinal ends of a first blade by a first coupling point, then securing the other end of said gripping means to a second coupling point of one of the longitudinal end of the second blade to assemble the two blades, the securing being made by a pivotal movement, the longitudinal end of the first blade and the longitudinal end of the second blade being juxtaposed, repeating the previous operation with the other opposite longitudinal ends of the two blades in order to assemble the two blades under the person in the assembly position, by a pivotal movement, to form the concave support surface under said person, and raising the device to transport the person.

19. A method for assembling a person transportation device according to claim 1, wherein the method comprises the following steps:

placing the concave support surface under the person lying on the ground, securing at least one of the gripping means to one of said longitudinal ends of the concave support surface, by a first coupling point, then securing said gripping means to a second coupling point of the same longitudinal end, the securing being made by a pivotal movement, the pivot point being the first coupling point, repeating the previous operation with another gripping means with the other one of said longitudinal ends of the concave support surface, and raising the device to transport the person.

* * * * *